UNITED STATES PATENT OFFICE.

THOMAS TAYLOR, OF WASHINGTON, DISTRICT OF COLUMBIA, ASSIGNOR TO HIMSELF AND WILLIAM FITCH, OF SAME PLACE.

IMPROVEMENT IN FERTILIZERS.

Specification forming part of Letters Patent No. 112,653, dated March 14, 1871; antedated March 1, 1871.

Be it known that I, THOMAS TAYLOR, of the city and county of Washington, District of Columbia, have invented a new and Improved Fertilizer, of which the following is a specification:

My invention relates to an improvement in fertilizers; and consists in a new combination of night-soil with other useful ingredients, and is composed as follows, viz:

Night-soil, peat, persalt of iron, clay, soluble silicates, and tincture of quassia, which I compound in the following manner:

I first prepare a solution of a persalt of iron by any of the well-known modes, which I use as a deodorizer of night-soil. I add the persalt to the night-soil, and mix thoroughly, or until the mass is deodorized of all excreta odor. To this I add ground peat and ground clay, (deodorizers and absorbers of moisture,) soluble silicates, and the tincture of quassia. I combine the whole properly by suitable machinery, after which I place the compound under cover, to dry by exposure to a dry atmosphere. The mixture is next ground into a fine powder, when it is fit for use.

I am aware that sulphate of iron has been long used as a deodorizer of night-soil; but it is found in practice not to be an effectual deodorizer, except when free ammonia is present in the compound, while the persalt of iron decomposes the sulphureted hydrogen at all when present.

"Sulphureted hydrogen converts a persalt into a protosalt with precipitation of sulphur," page 562 Elements of Chemistry, (Grahm.) Copperas, therefore, is not decomposed by the sulphureted hydrogen of night-soil, and in this my claim differs from Mr. Fish's two patents. I therefore do not use the same deodorizer used by Mr. Fish in his patents of July 20 and August 11, 1869, and which contain common salt, peat-ashes, charcoal, gypsum, tincture of almonds, tincture of coffee, and coffee-grounds, substances which I neither claim nor use.

What I claim, and desire to secure by Letters Patent, is—

The combination of night-soil with peat, clay, soluble silicates, a persalt of iron, and tincture of quassia, in all proportions, when combined substantially in the manner and for the purpose as set forth and described.

THOMAS TAYLOR.

Witnesses:
S. M. POOL,
D. P. COWL.